United States Patent [19]
Bustin

[11] 3,752,396
[45] Aug. 14, 1973

[54] TRACTION MAT

[76] Inventor: Leopold Bustin, P. O. Box 589, Dover, N.J. 07801

[22] Filed: July 16, 1971

[21] Appl. No.: 163,370

[52] U.S. Cl. .................................. 238/14, 52/660
[51] Int. Cl. ..................... E01b 23/00, E04f 15/06
[58] Field of Search ................... 238/14, 3; 94/5, 94/13; 52/660, 664, 670; 14/73

[56] References Cited
UNITED STATES PATENTS

| | | | |
|---|---|---|---|
| 2,377,648 | 6/1945 | Prince.................................. | 52/660 |
| 3,291,393 | 12/1966 | May...................................... | 238/14 |
| 1,500,249 | 7/1924 | McCracken et al. ................ | 238/14 |
| 3,109,349 | 11/1963 | Lorig .................................... | 52/660 |

Primary Examiner—Gerald M. Forlenza
Assistant Examiner—Richard A. Bertsch
Attorney—Popper, Bain, Bobis & Gilfillan

[57] ABSTRACT

A traction mat for positioning between a driving wheel of a motor vehicle and a roadway or the like which is covered with ice, so as to provide friction between the wheel of the motor vehicle and the roadway, is disclosed to comprise a plurality of generally longitudinally extending strips having a plurality of bends formed in each longitudinally extending strip, each strip extending generally longitudinally and including a plurality of spaced direction-reversing bends as well as a plurality of intermediate bends disposed between adjacent direction-reversing bends, the longitudinally extending strips being transversely spaced and longitudinally positioned such that the outside surface of each strip along its direction-reversing bends is in contact with the outside surface of the next adjacent strips along the direction-reversing bends, means for securing the adjacent longitudinally extending strips at their direction-reversing bends and a plurality of longitudinally spaced prongs formed on the upper and lower surfaces of each longitudinally extending strip to define friction elements for providing non-slip engagement between the ice of the roadway and the traction mat as well as between the wheel of the motor vehicle and the mat.

2 Claims, 4 Drawing Figures

Patented Aug. 14, 1973  3,752,396

INVENTOR
LEOPOLD BUSTIN
BY POPPER, BAIN, BOBIS & GILFILLAN
ATTORNEYS 3,752,396

TRACTION MAT

BACKGROUND OF THE INVENTION

This invention relates to traction devices of the type which may be inserted between the wheel of a vehicle and the surface of an ice covered roadway or the like to provide improved traction for the vehicle wheels.

Devices for insertion between the wheel of a vehicle and a road surface for improving the traction between the wheel and the road have been suggested. For example, friction generating elements have been secured to flexible strips as is suggested in U. S. Pat. No. 3,425,624. It has also been suggested in U. S. Pat. No. 3,291,393 to pivotally connect a plurality of sheet metal elements to form a traction mat. Others have suggested cast devices (U. S. Pat. Nos. 2,577,890) and complementary stamped devices (U. S. Pat. No. 3,096,939).

Although somewhat acceptable, such prior art devices have been unsatisfactory in many respects. Particularly, devices which have utilized flexible strips as mounting means for the friction generating devices have not been capable of distributing the load of a wheel and have been subject to sinkage thus rendering them useless. Similarly, stamped metal devices have been found to be subject to deflection and failure of the friction generating components by work hardening and shearing.

The traction mats which have utilized pivoted members have been unsatisfactory not only because they tend to sink in the same manner as the flexible member mats, they also are subject to corrosion at their pivoting members thus rendering them relatively useless. The cast devices have been too stiff and thus incapable of distributing a wheel load. Further, such devices are subject to brittle failure in extreme cold, their openings tend to become clogged with ice and, as a general comment, cast devices are extremely unwieldy to manipulate by the average user. In fact, the inability of such devices to achieve a satisfactory grip on icy surfaces has caused injury to bystanders resulting from their being hit by flying mats which are propelled from under the wheels of cars.

The present invention is a unique traction device comprising a unique grating-like element which is structured to define a traction mat. Although somewhat similar grating structures are known in the art, see for example my inventions as disclosed in U.S. Pat. Nos. 2,668,484 and 2,830,509, the present traction mat comprises an extension of the concepts of my grating inventions to define a novel traction mat.

SUMMARY OF THE INVENTION

It is an object of the present invention to provide a traction device which is sufficiently flexible to distribute a wheel load and yet sufficiently rigid to preclude sinkage e. g. within the ice of an ice covered road surface.

Another object of the present invention is to provide a traction device having a structure which is strong and capable of improved load transmission from a wheel to a roadway and which is virtually impossible to propel from under the wheel of a vehicle in a dangerous manner.

Yet another object of the present invention is to provide a traction device having friction generating projections on its upper and lower edges which are integral with the basic mat structure and which provide satisfactory gripping of both the automotive wheel and of the coated road surface or other slippery surface on which it is being used.

These objects and others not enumerated which will be evident to those skilled in the art are achieved by the present invention, one embodiment of which may comprise a plurality of generally longitudinally extending strips, each strip being generally rectangular in cross-section and having a pair of spaced relatively short surfaces and a pair of spaced relatively long surfaces extending transversely of its longitudinal axis, a plurality of bends formed in each longitudinally extending strip, said bends including longitudinally spaced direction-reversing bends and intermediate bends disposed between the direction-reversing bends; the longitudinally extending strips being transversely spaced and longitudinally positioned such that the outside surface of each strip along its direction-reversing bends is in contact with the outside surface of the next adjacent strip along their direction-reversing bends; means for securing the adjacent longitudinally extending strips at their direction reversing bends, and a plurality of longitudinally spaced relieved sections formed in each pair of spaced relatively short surfaces, the relieved sections for defining a plurality of friction generating projections on said longitudinally extending strips.

BRIEF DESCRIPTION OF THE DRAWINGS

A more complete understanding of the present invention may be had from the following detailed description thereof, particularly when read in light of the accompanying drawings, wherein.

DETAILED DESCRIPTION

Figure 1:
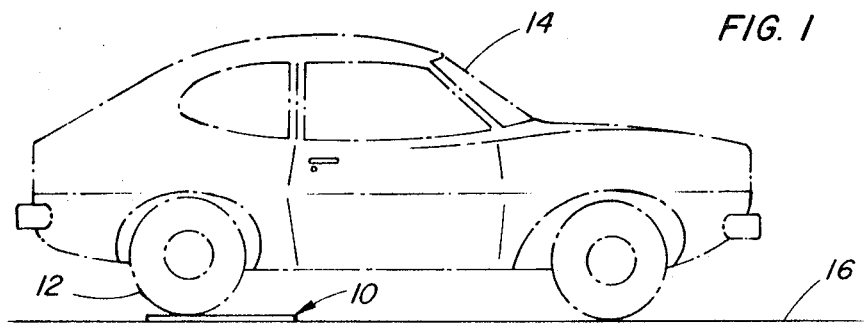
FIG. 1 is a view of a traction mat according to the invention being utilized to assist a motor vehicle get traction on an ice covered road.

Referring therefore to FIG. 1, a traction mat according to the invention, designated generally by the reference numeral 10, is shown positioned between the wheel 12 of a motor vehicle 14 and a roadway 16 which, for purposes of this disclosure, will be assumed to be ice covered.

Figure 2:
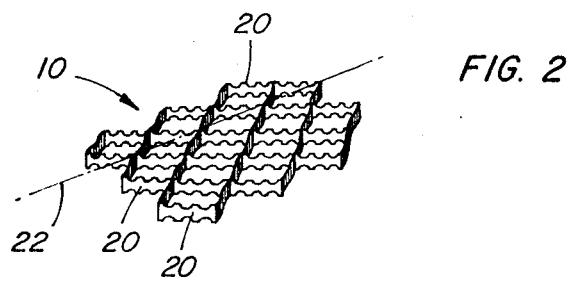
FIG. 2 is a perspective view of a traction mat according to the invention.

As may best be seen in FIG. 2, traction mat 10 is generally rectangular in shape and comprises a plurality of generally longitudinally extending strips 20. As will be discussed below in detail, each of strips 20 is bent to define a sinuous path along a generally longitudinally extending axis. The respective strips are secured to next adjacent strips and cooperate to define the mat 10.

Figure 3:
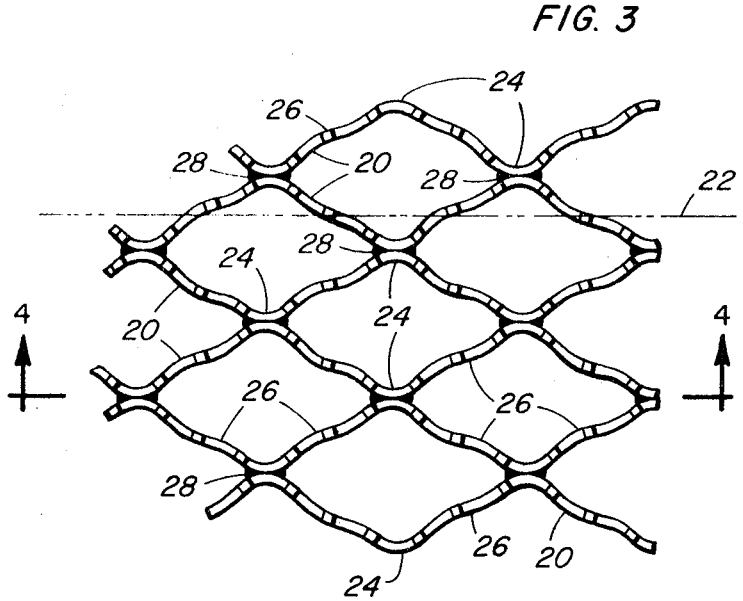
FIG. 3 is a plan view of the traction mat of FIG. 2.

Referring to FIG. 3, a plurality of generally longitudinally extending strips 20 are shown in cooperation to define a traction mat 10 according to the present invention. Each strip 10 defines a generally longitudinally directed sinuous path about a longitudinally extending axis 22. The sinuous path defined by strips 20 about their respective axes includes a plurality of direction-reversing bends 24, each of which is separated from the next adjacent direction-reversing bend by a plurality of intermediate bends 26.

Strips 20 are positioned longitudinally such that the direction-reversing bends 24 of adjacent strips 20 are juxtaposed. In this manner, the outer surfaces of strips 20 at their direction-reversing bends 24 are in surface-to-surface contact to facilitate the securing of the adjacent strips. In this regard, the adjacent strips 20 of mat 10 as disclosed are secured by welds 28.

Figure 4:
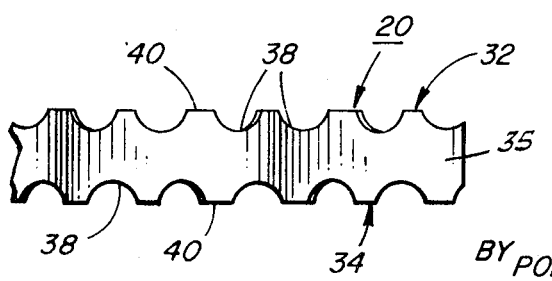
FIG. 4 is a cross-sectional elevational view through the plane 4—4 of FIG. 3.

Strips 20 are generally rectangular in configuration having a pair of opposed upper 32 and lower 34 relatively short surfaces and a pair of opposed relatively long generally vertically extending surfaces only, one of which, surface 35, can be seen in FIG. 4, the other surface being generally parallel to and opposite surface 35. As may best be seen in FIG. 4, the upper and lower surfaces of each strip 20 are provided with a plurality of longitudinally spaced relieved portions 38. In the mat 10 shown, relieved portions 38 are generally semi-circular in cross-section. It is to be recognized, however, that relieved portions 38 can be other than semi-circular in cross-section as may be desired for a particular mat usage.

Relieved portions 38 are spaced to define therebetween a plurality of projections 40, the surfaces of which are generally flat. Projections 40 of the upper surface 32 of each strip 20 are adapted to frictionally engage the surface of wheel 12. Similarly, the projections 40 of lower surface 34 of each strip 20 are adapted to frictionally engage the ice coating of roadway 16. In this regard, it should be noted that structurally there is no difference between the projections of upper surface 32 and the projections of lower surface 34 and as such the traction mat according to the invention is reversible.

With respect to the size and spacing of relieved portions 38, it has been found that the radius of each portion 38 should be between five thirty-seconds and seven thirty-seconds inches so that proper traction can be achieved. Further, in order to prevent tire damage while permitting a capability for gripping, the relieved portions should be spaced such that projections 40 are between one-eighth and three-sixteenths inches in length.

Considering now the manufacture of a traction mat 10 according to the invention, a blank for a strip 20 may be a straight, conventional section of bar stock or strip metal such as hot or cold rolled steel or aluminum. The blank strip may initially be fed through a suitable boring or stamping apparatus for the purpose of forming relieved portions 38. Thereafter, the bends in each strip 20 may be formed by suitable metal bending apparatus, many of which are generally known in the art.

With relieved portions 38 formed and each strip 20 bent as desired, a plurality of strips 20 are disposed side by side in sufficient number to form a mat of desired width. Thereafter, the strips are longitudinally positioned such that the direction-reversing bends of adjacent strips are in surface-to-surface contact. With the strips so positioned, they are welded or otherwise secured at their lines of contact to define a unified structure.

Mats 10 are preferably cut to length along a transverse line which intersects the welded areas of adjacent strips. The cutting may be by any of many known techniques such as sawing or burning. Thereafter, the mat surfaces may be suitably degreased and otherwise prepared and a suitable painting may be accomplished.

The manner of using mats 10 is quite simple. In the event that a motor vehicle gets stuck on a roadway, the mat which may be carried in the trunk or other suitable storage area of the automobile may be withdrawn and placed under the leading edge of the drive wheel or wheels of the motor vehicle. In this regard, the use of two mats for dual drive wheel vehicles is desirable and necessary where the vehicles are not provided with a non-slip transmission.

The acceleration of the motor vehicle with the traction mat positioned thereunder causes the projections on the mat to engage the surface of the wheel as well as the icy surface of the roadway. Such friction engagement eliminates slippage caused by the ordinary slippage between the wheel and the roadway and permits the vehicle to propel itself forwardly. The efficiency of the traction mat according to the invention is favorable as compared with prior art devices because of the plurality of bends provided in each longitudinally extending strip. More specifically, the plurality of intermediate bends between the direction-reversing bends provides for a greater number of reaction surfaces and contact points between the wheel and the surface on which the traction mat is placed thereby providing less chance for the traction mat to slip itself with respect to an ice covered surface.

Although only one embodiment of the present invention has been disclosed in detail, it is considered to be manifest that many modifications and variations of this invention can be made without departing from the spirit and scope thereof.

I claim:

1. A traction mat for positioning between a driving wheel of a motor vehicle and the ground, the mat comprising:

a plurality of generally longitudinally extending strips, each strip being generally rectangular in cross-section and having a pair of spaced relatively short surfaces and a pair of spaced relatively long surfaces extending transversely over its longitudinal axis;

a plurality of bends formed in each longitudinally extending strip, said bends including longitudinally spaced direction-reversing bends and intermediate bends disposed between said direction reversing bends;

said longitudinally extending strips being transversely spaced and longitudinally positioned such that the outside surface of each strip along the direction-reversing bends is in contact with the outside surface of the next adjacent strips along their direction-reversing bends;

means for securing said adjacent longitudinally extending strips along the direction-reversing bends along their lines of contact; and a plurality of longitudinally spaced relieved sections formed in each said pair of spaced relatively short surfaces, said relieved sections being semi-circular in cross-section and longitudinally spaced to define a plurality of friction-generating projections, said friction generating projections being substantially flat on their wheel engaging surfaces, and said relieved sections are spaced such as to provide that said friction generating projections are between 1/8 and 3/16 inches in length.

2. A traction mat according to claim 1 wherein said relieved sections are semi-circular and the radius of each is between five thirty-seconds and seven thirty-seconds inches, inclusive.

* * * * *